Patented Mar. 5, 1935

1,993,490

UNITED STATES PATENT OFFICE 1,993,490

ALUMINIUM SOLDER

Friedrich Strasser, Basel, Switzerland

No Drawing. Application December 23, 1933, Serial No. 703,849. In Germany December 30, 1932

1 Claim. (Cl. 75—1)

For soldering aluminium solders are known which are composed of the four components aluminium, tin, zinc and silver. These solders were suitable for some soldering purposes of minor importance. If the pieces to be soldered were of large dimensions or if these pieces were thick and especially if the soldered parts were exposed to sea-water or salt containing air, these known solders gave no satisfaction. These known solders of aluminium, tin, zinc and silver are characterized by an excess of tin and they were considerably too poor in aluminium. They therefore were solders of the tin character. The contents of aluminium of this known class of solders was maximum one fifteenth of the contents of zinc.

The solder according to the invention is based on the discovery of the inventor, that the aluminium solders must contain much more aluminium and considerably less tin, to suit such soldering purposes, for which the known solders gave no satisfaction.

The inventor has found that the percentage of aluminium must be nearly equal to the percentage of tin. Of course some differences in the percentages above and below the indicated proportion are allowed without altering the character of the new solder. The percentage of zinc and silver together are to be chosen nearly equal to the percentage of one of the components aluminium or tin, the percentage of silver being nearly the double of that of zinc.

The new solder is easily fusible and more fluid and it offers the advantage over the known solders that in melting there is not the least development of vapour or gas. A further very remarkable progress is offered by the new solder in that, that the surface of the solder, which is applied to the points to be soldered remains equally clean and free from slags. A further valuable peculiarity of the new solder consists in its being suitable for being molten again after being applied for the first time to the soldering point, without forming grains or slags or without being decomposed in its several metal components.

This latter peculiarity permits that on the points to be soldered the solder may be molten several times, so that it can be pointed along the points to be soldered. It is further possible to apply the solder first on the points to be soldered, then to cool them and to heat them again and to unite the several layers to one solder adhering firmly and homogeneously together.

An example of the composition of the new solder is the following:—

| | Parts by weight |
|---|---|
| Aluminium | 39 |
| Tin | 33 |
| Zinc | 11 |
| Silver | 23 |

Here the number of parts of aluminium is equal to the number of parts of tin and the sum of the parts of zinc and silver is equal to the number of parts of one of the other components.

This solder presents a greater resistance against corrosion in salt-water, what would be very convenient for seacraft. In a test in which the soldered part was cooked for 96 hours at 90° centigrade in a solution of water containing 5 per cent of chloride of sodium, there were no cracks or bubbles to be observed and the weight was only increased for 0.13 per cent.

I claim:

An aluminium solder consisting of 33 parts of aluminium, 33 parts of tin, 11 parts of zinc and 23 parts of silver.

FRIEDRICH STRASSER.